United States Patent
Kobayashi (10) Patent No.: US 7,639,158 B2
(45) Date of Patent: Dec. 29, 2009

(54) MONITORING TERMINAL DEVICE

(75) Inventor: Ikutaro Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 622 days.

(21) Appl. No.: 10/854,430

(22) Filed: May 27, 2004

(65) Prior Publication Data
US 2004/0239524 A1 Dec. 2, 2004

(30) Foreign Application Priority Data
May 28, 2003 (JP) ............................ 2003-150061

(51) Int. Cl.
*B60C 23/00* (2006.01)
(52) U.S. Cl. ................ 340/870.07; 340/447; 340/10.34
(58) Field of Classification Search .................. 345/ 539.22–539.29; 340/447, 10.34; 455/343
See application file for complete search history.

(56) References Cited

U.S. PATENT DOCUMENTS

2002/0126005 A1 * 9/2002 Hardman et al. ............ 340/442

FOREIGN PATENT DOCUMENTS

| JP | 02-040441 | 2/1990 |
|---|---|---|
| JP | 03-063900 | 3/1991 |
| JP | 04-101597 | 4/1992 |
| JP | 05-089393 | 4/1993 |
| JP | 2001-336904 | 12/2001 |
| JP | 2002-42082 | 2/2002 |

OTHER PUBLICATIONS

Japanese Office Action dated Sep. 9, 2008 with Partial English Translation.

* cited by examiner

*Primary Examiner*—Brian A Zimmerman
*Assistant Examiner*—Hung Q Dang
(74) *Attorney, Agent, or Firm*—McGinn IP Law Group, PLLC (57) ABSTRACT

A monitoring terminal device is provided which is capable of reducing its power consumption to a minimum and of being fully operated even indoors by using a solar cell as a power source. In the monitoring terminal device including a sensor unit and a transmitting unit having a wireless communication function to transmit, by wireless, a sensor monitoring output, the sensor and wireless transmitting unit are activated intermittently, and, when the monitoring terminal device is not operating, supply of power to the sensor unit and transmitting unit is stopped and a control processor is put into a sleep state, which enables reduction of power consumption to a minimum. This ensures a long operation of the monitoring terminal device even in an environment in which power is not supplied from the outside.

8 Claims, 10 Drawing Sheets

MONITORING TERMINAL DEVICE

BACKGROUND OF THE INVENTION

1. Field of the Invention

The present invention relates to a monitoring terminal device and more particularly to the monitoring terminal device having a sensor and a wireless transmitting unit to transmit, by wireless, a monitoring output fed from the sensor.

The present application claims priority of Japanese Patent Application No. 2003-150061 filed on May 28, 2003, which is hereby incorporated by reference.

2. Description of the Related Art

Applications of communication terminals in a communication network typified by the Internet are spreading out from a personal computer and/or a portable cellular phone to an information household electrical appliance. Moreover, by placing various sensors that can observe and monitor a variety of physical quantities in every location where needed in an artificial environment and/or a natural environment and by using information fed from these sensors, it is anticipated that the artificial environment and/or the natural environment will be systematically controlled.

That is, it is expected that a sensor and/or an alarm device placed in the natural environment and, moreover, various sensors and/or alarm devices placed in buildings and/or homes making up the artificial environment will be connected to a network and a monitoring output fed from these sensors and/or alarm devices will be utilized. For example, such a monitoring output can be used for managing temperatures of a paddy field or for detecting a landslide or a like in the natural environment, for checking on an opening or closing state of a window or an operating state of electrical appliances in a household environment, and for checking a state of various alarm devices at an entrance door using a portable cellular phone or a like before going out.

In these sensors, when they are placed in the natural environment in particular, it is desirable that supply of power from the outside or wiring for transmission of information is no longer needed. Therefore, these sensors have to have the same function of transmitting information as a wireless transmitting device, such as a radio transmitter, and an optical transmitter, has and it is necessary that their terminals can operate for a long time without supply of power from the outside.

Technology aiming at reducing power consumption in a non-contact type IC (Integrated Circuit) tag embedding a battery is disclosed in Japanese Patent Application Laid-open No. 2002-42082 (See Pages 3 and 4, and FIG. 6.) in which a sleeping state of a CPU (Central Processing Unit) in the IC tag is changed to its operating state in response to an external trigger. That is, the CPU in the IC tag is ordinarily put in the sleeping state and, only when communication between the IC tag and an external device is required, the CPU is put into its operating state by feeding a trigger to the CPU from the external device.

However, the above-disclosed technology has a disadvantage. That is, in order to receive a trigger from the external device, a trigger receiving section of the CPU has to be always put in its operating state and, as a result, it is impossible to reduce power consumption in the trigger receiving section.

SUMMARY OF THE INVENTION

In view of the above, it is an object of the present invention to provide a monitoring terminal device which is capable of reducing its power consumption to a minimum.

It is another object of the present invention to provide a monitoring device which is capable of being fully operated even indoors by using a solar cell as a power source.

According to a first aspect of the present invention, there is provided a monitoring terminal device including:

a sensor unit;

a wireless transmitting unit to transmit, by wireless, an output from the sensor unit; and a control unit to start operations of the sensor unit in a specified cycle and to have the sensor unit operate for a specified period of time and to start operations of the wireless transmitting unit in a cycle being longer than the specified cycle and to have the wireless transmitting unit to perform operations of communications for a specified period of time.

In the foregoing, a preferable mode is one wherein the control unit has a power source managing unit to supply power only while the sensor unit and/or the wireless transmitting unit are operating.

Also, a preferable mode is one wherein the control unit has a timer to control starting cycles of the sensor unit and/or the wireless transmitting unit and to control so that only the timer operates when the sensor unit and/or the wireless transmitting unit are not operating.

Also, a preferable mode is one wherein the control unit starts and controls the wireless transmitting unit in response to a change in an output from the sensor unit.

Also, a preferable mode is one wherein the control unit, by learning frequency of a change in the output from the sensor unit, changes starting cycles of the sensor unit.

Also, a preferable mode is one wherein the control unit makes the starting cycles of the sensor unit variable depending on a type of the sensor unit.

Also, a preferable mode is one that which includes a power source constructed of at least one of a solar cell, secondary cell, and a capacitor.

Also, a preferable mode is one wherein the solar cell is of an amorphous type.

Also, a preferable mode is one wherein the sensor unit is a proximity-perception-type lead switch.

Furthermore, a preferable mode is one wherein the wireless transmitting unit transmits a signal for fault diagnosis in a specified cycle.

An additional preferable mode is one wherein the sensor unit is used to observe and monitor a specified kind of physical quantity.

A still additional preferable mode is one wherein the sensor unit is used to observe and monitor temperature.

Another preferable mode is one wherein the wireless transmitting unit transmits by radio an output from the sensor unit.

Still another preferable mode is one wherein the wireless transmitting unit transmits by light an output from the sensor unit.

With the above configurations, the sensor unit and the wireless transmitting device are activated intermittently and supply of power to these is stopped while the sensor unit and/or the wireless transmitting device are not operating and the control function itself of the control unit is put into a sleep state and, therefore, current consumption of the monitoring terminal device can be reduced to a minimum and the monitoring terminal device can be operated even in an environment in which power is not supplied to it from the outside.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
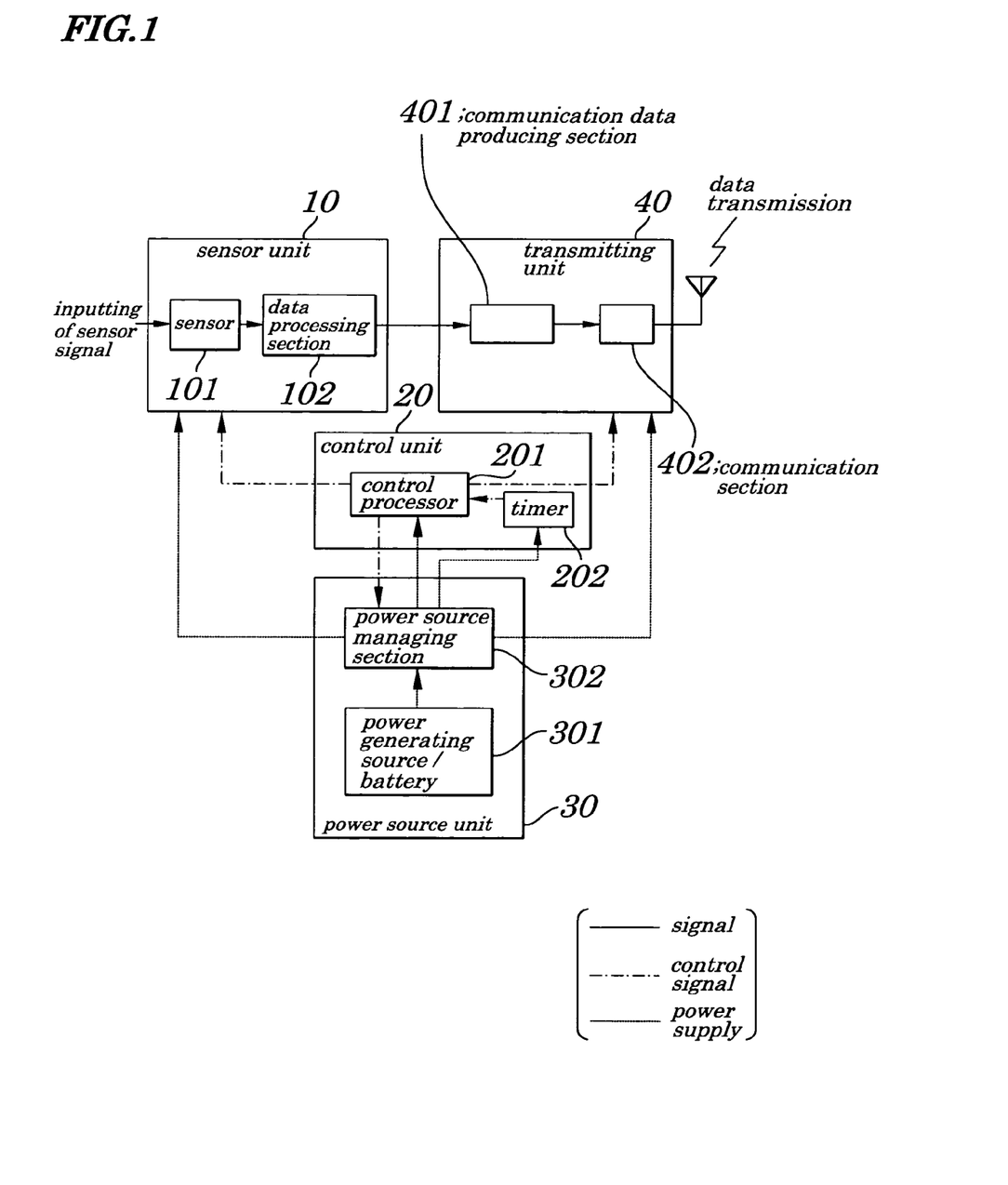
FIG. 1 is a block diagram of a monitoring terminal device according to a first embodiment of the present invention.

FIG. 1 is a block diagram of a monitoring terminal device according to a first embodiment of the present invention. As shown in FIG. 1, the monitoring terminal device of the first embodiment includes a sensor unit 10 to observe and monitor a specified kind of physical quantity, a control unit 20, a power source section 30, and a transmitting unit 40.

The sensor unit 10 is made up of a sensor 101 used to convert a physical quantity such as a temperature into an electrical signal, and of a data processing section 102 used to produce measurement data by performing data processing including an A/D (Analog to Digital) conversion of the electrical signal fed from the sensor 101, accumulation of data, detection of a change in data, addition of information obtained from an object to be measured (such as temperatures), or a like.

The control unit 20 has a control processor 201 used to start an operation of the sensor unit 10, to control its measuring cycle and measuring time, to exert control on an operation start of the transmitting unit 40 and on its measuring cycle and measuring time, to manage supply of power (that is, ON/OFF) to the sensor unit 10 and to the transmitting unit 40, which is put into a sleep state when operations of the sensor unit 10 and the transmitting unit 40 are terminated and which is restored to its original operating state by a pulse fed from a timer 202 and has the timer 202 used to output a pulse in every shortest operating cycle of the monitoring terminal device of the embodiment and to have operations of the control processor 201 be restored by using the pulse.

The power source section 30 includes a power generating source/battery 301 to supply power to the sensor unit 10, control unit 20, and transmitting unit 40 and a power source managing section 302 to turn On and Off the power to the sensor unit 10 and the transmitting unit 40. As the power generating source/the battery 301, a combination of a solar cell and a secondary cell or only the solar cell is used. When the monitoring terminal device is used indoors, in particular, an amorphous-type solar cell that can absorb well spectra from a fluorescent lamp is effectively employed.

The transmitting unit 40 is made up of a communication data producing section 401 to produce communication data used when measurement data fed from the data processing section 102 is transmitted by a communication section 402 and the communication section 402 to transmit (generally by wireless such as radio and light) communication data fed from the communication data producing section 401.

Figure 2:
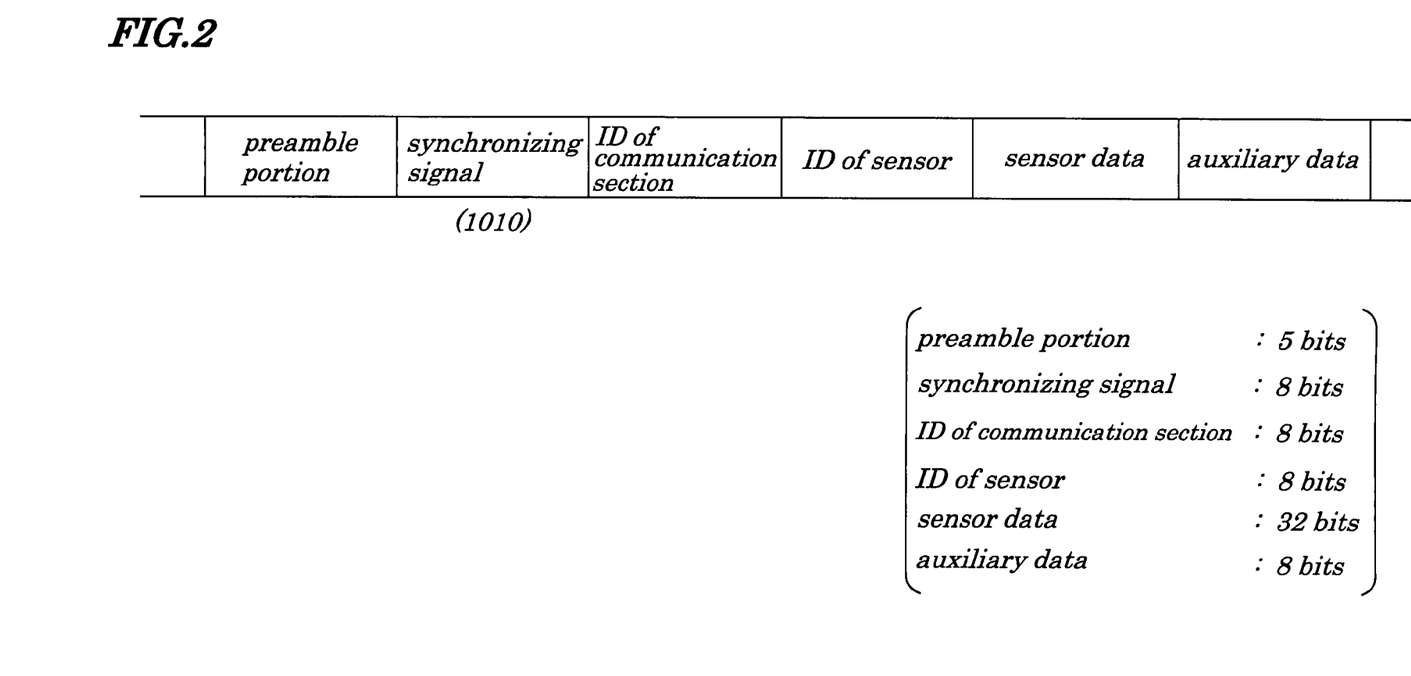
FIG. 2 is a diagram showing an example of communication data format to be used in the first embodiment of the present invention.

The communication data, as an example of the format of the communication data is shown in FIG. 2, is arranged in order of a preamble portion, a synchronizing signal for synchronization in communications, an ID (Identification) of a communication section, an ID of a sensor, a data region of the sensor, and an auxiliary data and a break of data is represented in a fixed-length format or a comma sign format.

Moreover, in FIG. 1, solid lines show a flow of data, alternate long and short dash lines show control signals, and broken lines show a flow of power supply.

Next, operations of the monitoring terminal device of the first embodiment are described below. A physical quantity (for example, a temperature in a room) in an artificial environment or in a natural environment is converted into an electrical signal by the sensor 101 in the sensor unit 10. Data processing including A/D conversion, accumulation of data, detection of presence or absence of a change in data, addition of information for every kind of object (temperature or a like) to be measured, or a like is performed by the data processing section 102 based on the electrical signal fed from the sensor 101 to produce measurement data.

Figure 3:
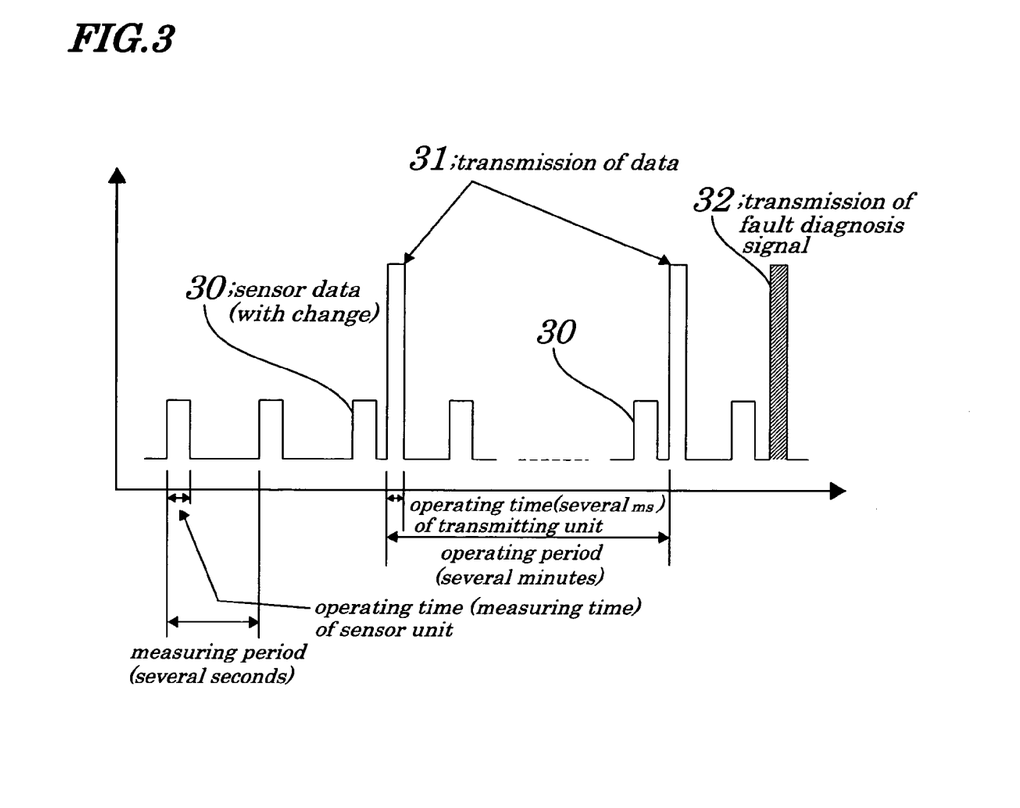
FIG. 3 is a diagram explaining reduction in power consumption by control on an operating cycle and on an operating time of a sensor unit and a transmitting unit exerted by a control processor shown in FIG. 1 according to the first embodiment of the present invention.

In the communication data producing section 401, communication data including IDs of terminals and measured data arranged in a frame as shown in FIG. 2 is created from the measurement data produced by the data processing section 102 and is transmitted from the communication section 402. The sensor unit 10, since control on its operating start, measuring cycle, and measuring time is exerted by the control processor 201, is operated intermittently as shown in FIG. 3. Similarly, the transmitting unit 40, since control on its operating start, operating cycle, and operating time is exerted by the control processor 201, is operated intermittently.

By operating the monitoring terminal device of the embodiment as above, currents required while neither the sensor unit 10 (consumed currents being several tens μA) nor the transmitting unit 40 (consumed currents being several hundreds μA) are operating are standby currents (several hundreds A) needed by the sensor unit 10 and the transmitting unit 40 and currents (several tens μA) to be consumed by the control processor 201 only and, therefore, power consumption is greatly reduced.

In the first embodiment of the present invention, the operating time of the sensor unit 10 and the transmitting unit 40 is set at several ms while the operating cycle is set at several seconds to several minutes. It is needless to describe that the operating time and operating cycle are properly selected depending on an object to be measured. Moreover, in the first embodiment of the present invention, since the transmitting unit 40, only when a change in the physical quantity measured by the sensor unit 10 (as shown by the number "30" in FIG. 3) occurs, operates to transmit communication data (as shown by the number "31" in FIG. 3), if the change is small, the operation of the transmitting unit 40 is further suppressed, which serves to reduce current consumption accordingly.

In such the control method as above, so long as a change in a physical quantity measured by the sensor unit 10 does not occur, since no data is transmitted from the transmitting unit 40, it is necessary to notify that the monitoring terminal device is operating normally. Therefore, it is desirable that a fault diagnosis signal is transmitted for confirmation of operating states in every specified operating cycle (in a specified operating cycle being longer than the operating cycle of the sensor unit 10 and/or the transmitting unit 40) (as shown by the number "32" in FIG. 3).

By properly selecting the ratio (Operation duty=operating time/operating cycle) between the operating time and the operating cycle of the transmitting unit 40, current consumption of the transmitting unit 40 can be reduced to a degree that it can be neglected when compared with current consumption of the sensor unit 10.

Average current consumption ("Psav") of the sensor unit 10 is given by a following equation:

$$Psav = Ps \times Ds$$

where "Ps" denotes current consumption at time of operation of the sensor unit 10, "Ds" denotes operation duty (=operating time ("Tsa") of the sensor unit 10/operating cycle ("Tst") of the sensor unit 10).

Average current consumption ("Ptav") of the transmitting unit 40 is given by a following equation:

$$Ptav = Pt \times Dt$$

where "Pt" denotes current consumption at time of operation of the transmitting unit 40, "Dt" denotes operation duty (=operating time ("Tta") of the transmitting unit 40/operating cycle ("Ttt") of the transmitting unit 40).

For example, if Ps=50 μA, Tsa=1 msec, Tst=5 minutes, Pt=5 mA, Tta=1 μsec, and Ttt=5 minutes, following equations are given:

$$Psa = 50 \, \mu A \times 1 \, msec/5 \, minutes$$

$$Ptav = 5 \, mA \times 1 \, \mu sec/5 \, minutes$$

$$Ptav/Psav = 0.1$$

Thus, current consumption of the transmitting unit 40 can be neglected when compared with current consumption of one piece (sensor 101) of the sensor unit 10.

The operation duty (Dt) of the transmitting unit 40 is given by a following equation:

$$Dt = Ds \times (Ps \times (\text{number of sensors})/Pt)/10$$

In order that an equation (Ptav/Psav=0.1) holds even in the case that the number of sensors is 10, the operation duty (Dt) of the transmitting unit 40 has to be as follows:

$$Dt = 1 \, msec/5 \, minutes \times (50 \, \mu A \times 10/5 \, mA)/10$$

Therefore, the operation duty (Dt) of the transmitting unit 40 may be set at about 1/1000 to 1/1000000.

Figure 4:
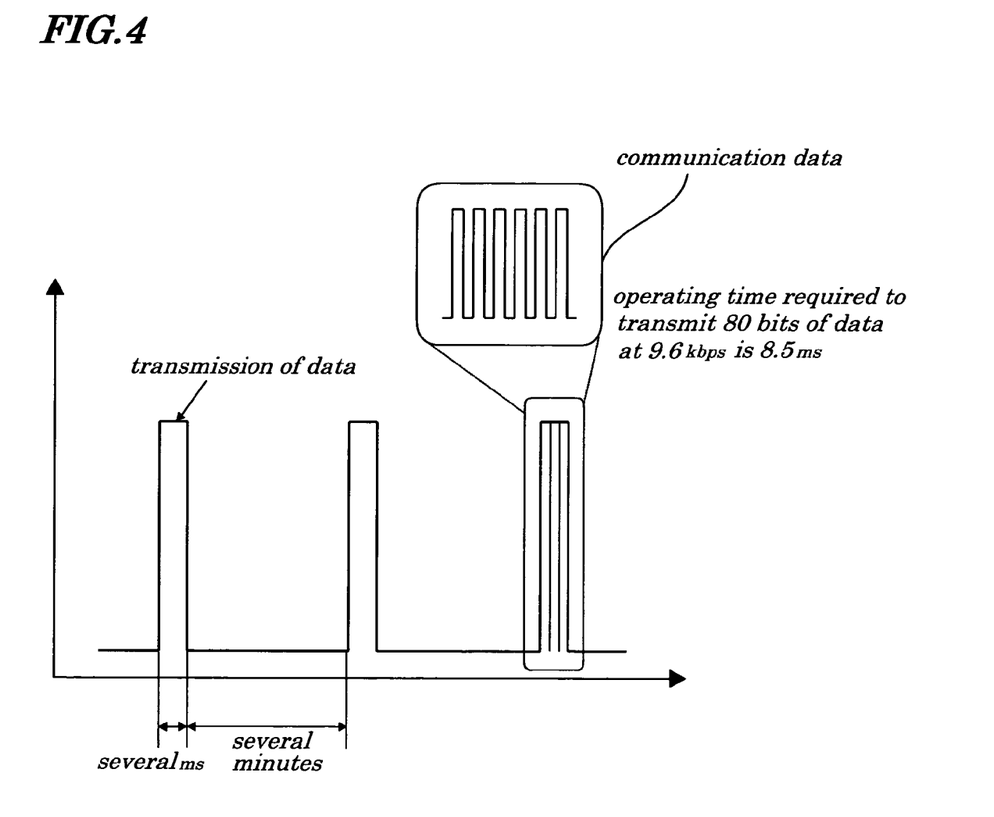
FIG. 4 is a diagram explaining reduction in power consumption achieved by a data transmission method employed in the transmitting unit according to the first embodiment of the present invention.

As described above, completion of data transmission by the transmitting unit 40 in a short time can be achieved by increasing a bit rate of communication data. For example, when data (about 80 bits) having a frame configuration as shown in FIG. 2, if the data is transmitted at 9.6 kbps, required operating time is 8.5 ms (see FIG. 4).

Figure 5:
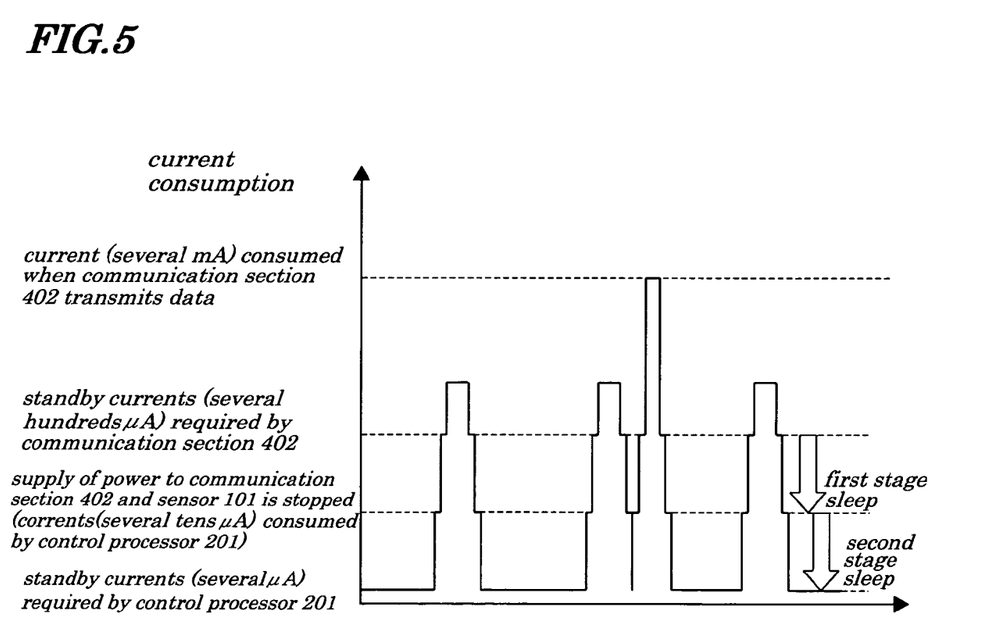
FIG. 5 is a diagram explaining management of power supply made by a control unit of the first embodiment of the present invention.

When current consumption at time of operations of the transmitting unit 40 can be neglected, standby currents of the transmitting unit 40 are relatively weighted heavily (see FIG. 5). In the monitoring terminal device of the embodiment of the present invention, while neither the sensor unit 10 nor the transmitting unit 40 are operated, the control processor 201 transmits a control signal to the power source managing section 302 to stop supply of power to both the sensor unit 10 and the transmitting unit 40. As a result, the standby currents required by the monitoring terminal device can be reduced to several tens μA (first stage sleep shown in FIG. 5).

Moreover, the control processor 201, by operating only the timer 202 which consumes currents less and by putting the control processor 201 into a sleep state, can reduce standby currents required by the monitoring terminal device to a level of the standby currents required by the control processor 201 being several μA (1.5 μA in the case of the first embodiment) (second stage sleep shown in FIG. 5). The timer 202 returns operations of the control processor 201 to its original state after a specified time being equivalent to a shortest operating cycle.

Therefore, even in an indoor place where sunlight does not reach directly, the monitoring terminal device can be fully operated using a solar cell (amorphous-type solar cell can supply 9 μA of output current and emit 200 lux of light for indoor brightness).

Second Embodiment

Figure 6:
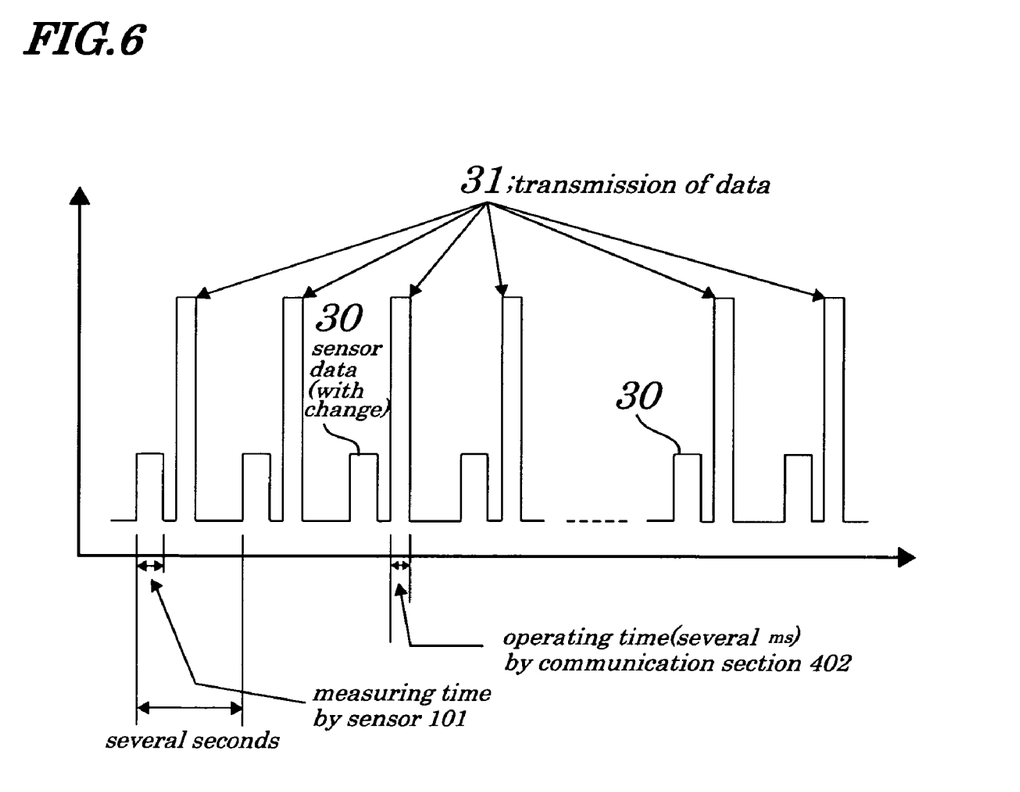
FIG. 6 is a diagram explaining operations of a monitoring terminal device of a second embodiment of the present invention.

Unlike in the case of the first embodiment of the present invention in which communication data is transmitted from the transmitting unit 40 only when a change in physical quantity measured by the sensor unit 10 occurs, in the second embodiment, as shown in FIG. 6, irrespective of a change in physical quantity measured by the sensor unit 10, communication data is transmitted from the transmitting unit 40 every time the measurement is made by the sensor unit 10 (see the number "31" in FIG. 6).

Third Embodiment

Figure 7:
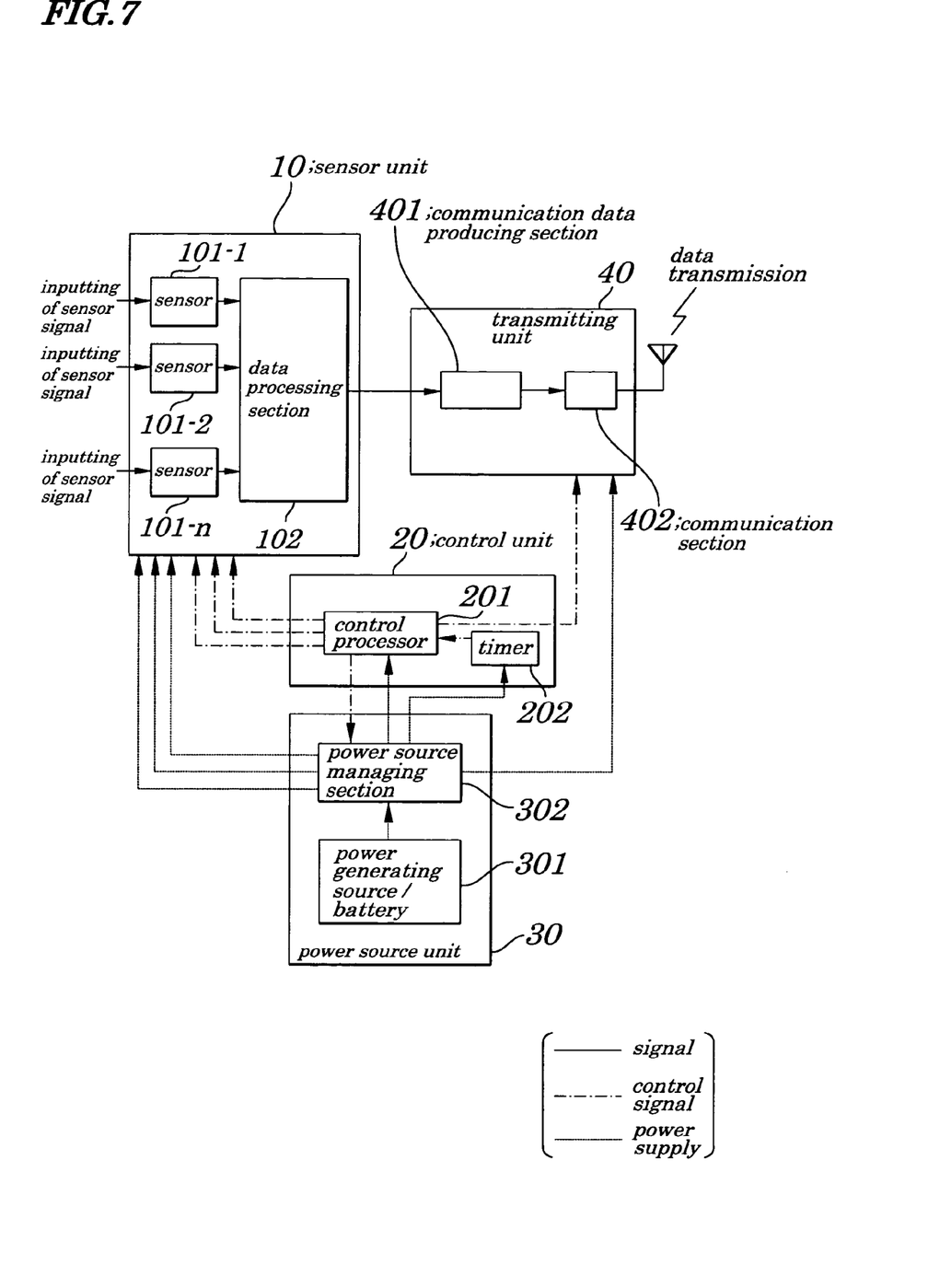
FIG. 7 is a block diagram of a monitoring terminal device according to a third embodiment of the present invention.

In the third embodiment, as shown in FIG. 7, a sensor unit 10 has two or more sensors 101-1 to 101-n ("n" is an integer being 2 or more), each of which measures a different physical quantity, and its data is transmitted from a transmitting unit 40. In FIG. 7, same reference numbers are assigned to components having the same function as those in FIG. 1.

Figure 8:
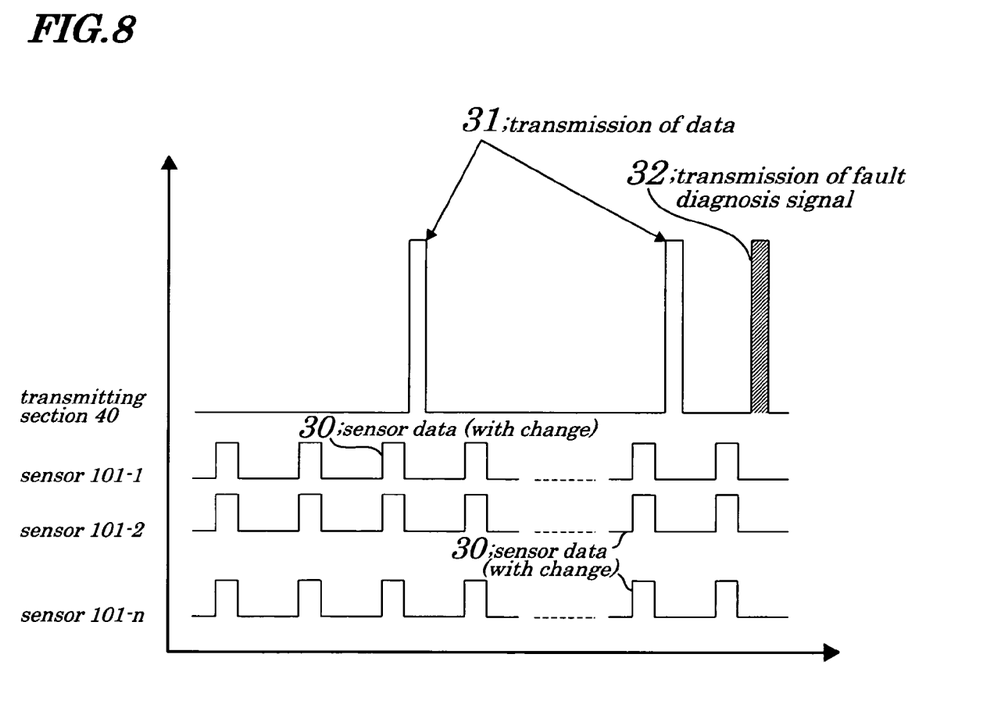
FIG. 8 is a diagram explaining operations of the monitoring terminal device of the third embodiment of the present invention.

In the third embodiment, as an example of each of the sensors 101-1 to 101-n, a thermistor is used for measurement of temperatures, an illumination sensor is used for measurement of illumination, and a proximity perception sensor (lead sensor) is used for detection of a closing or opening state of a window. Moreover, any sensor, so long as a physical quantity detected by the sensor can be converted into an electrical signal, may be employed which includes a slope detecting sensor (mercury switch), smell sensor, sound pressure sensor, or a like. FIG. 8 is a diagram explaining operations of the monitoring terminal device of the third embodiment of the present invention.

Fourth Embodiment

Figure 9:
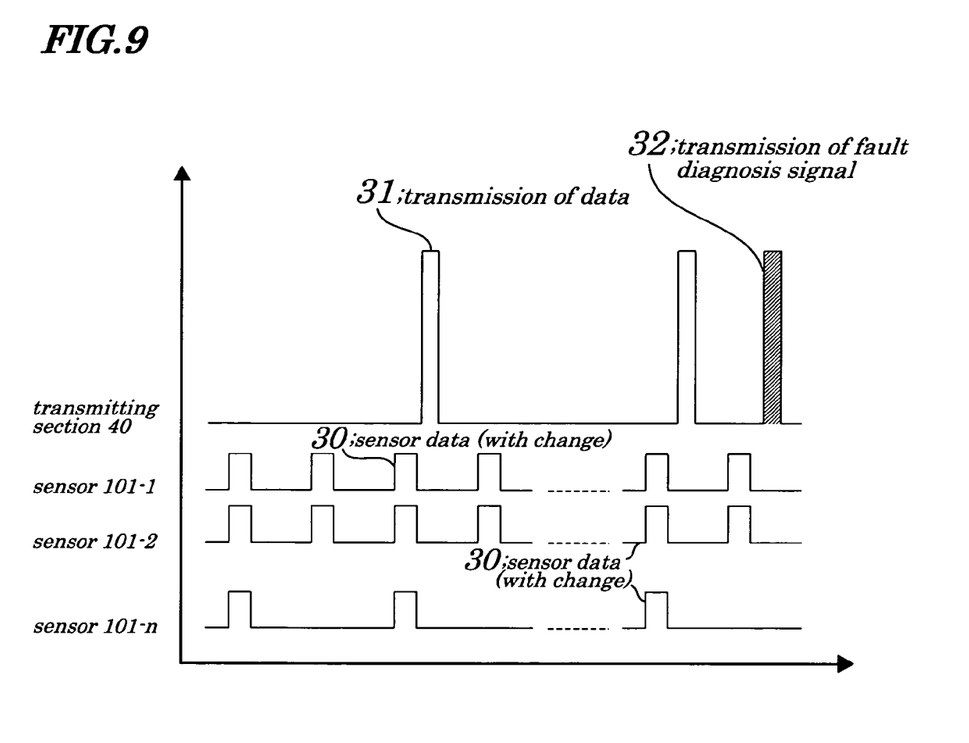
FIG. 9 is a diagram explaining operations of a monitoring terminal device of a fourth embodiment of the present invention.

Unlike in the case of the third embodiment shown in FIG. 8 in which intervals among time points for measurement by each sensor are the same, in a fourth embodiment shown in FIG. 9, measuring cycle and/or measuring time by each of sensors 101-1 to 101-3 may be different from each other depending on each kind of physical quantities measured by a sensor unit 10. For example, when a temperature or illumination of a room is measured or when a state of closing and opening a window is confirmed, since frequency of closing and opening a window is smaller compared with frequency of a change in a temperature (for example, to be measured by the sensor 101-1) or illumination (for example, to be measured by the sensor 101-2), a cycle for confirming frequency of a change in a temperature can be set to be longer compared with a cycle for measuring a temperature or illumination. By operating the monitoring terminal device as above, it is made possible to decrease the number of sensors which start operations at the same time and to reduce current consumption of the monitoring terminal device.

Fifth Embodiment

Figure 10:
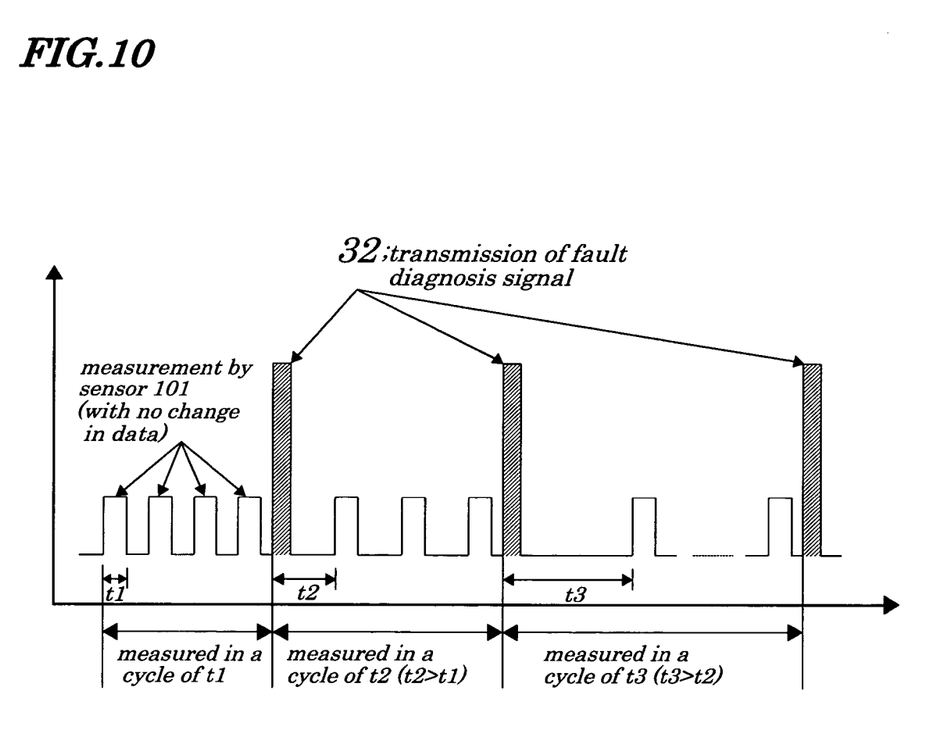
FIG. 10 is a diagram explaining operations of a monitoring terminal device of a fifth embodiment of the present invention.

Unlike in the case of each of the above embodiments in which a measuring cycle is set to be in a fixed state, in a fifth embodiment shown in FIG. 10, the operation can be performed in a manner that, by learning frequency of a change in data, a measuring cycle is changed. For example, as shown in FIG. 10, if no change in data measured by a sensor 101 occurs in an initial measuring cycle of t1 during a fixed period of time, the measuring cycle t1 is lengthened to become t2 (t2>t1) and if no change in data measured by the sensor 101 occurs in the lengthened measuring cycle t2 during a fixed period of time, the measuring cycle t2 is lengthened to become t3 (t3>t1).

In contrast, if a change in data measured by the sensor 101 occurs every time the measurement is made, the measuring cycle is shortened. This enables the measuring cycle to be set to be longer if a change in a value of an object to be measured occurs less, which serves to reduce current consumption of the monitoring terminal device. A data transmitting cycle can be varied depending on a change in the measuring cycle.

Moreover, as a power generating source/battery 301, a solar cell, secondary cell, capacitor, and a combination of these may be used.

By constructing a control unit 20, power source managing section 302, transmitting unit 40, or a like using IC (Integrated Circuit) chips which can perform processes including the power source managing processing, signal processing, frame construction processing in the above sections, it is made possible to standardize the monitoring terminal device of the present invention, which can provide advantages of easiness of design, reduction in manufacturing costs, or a like.

It is apparent that the present invention is not limited to the above embodiments but may be changed and modified without departing from the scope and spirit of the invention.

What is claimed is:

1. A monitoring terminal device; comprising:
   a sensor unit;
   a wireless transmitting unit to transmit, by wireless, an output from said sensor unit; and
   a control unit to start operations of said sensor unit in a specified cycle and to have said sensor unit operate for a specified period of time and to start operations of said wireless transmitting unit in a cycle being longer than said specified cycle and to have said wireless transmitting unit to perform operations of communications for a specified period of time,
   wherein said control unit, by learning a frequency of a change in said output from said sensor unit, changes starting cycles of said sensor unit.

2. The monitoring terminal device according to claim 1, further comprising a power source including at least one of a solar cell, a secondary cell, and a capacitor.

3. The monitoring terminal device according to claim 1, wherein said sensor unit comprises a proximity-perception-type lead switch.

4. The monitoring terminal device according to claim 1, wherein said wireless transmitting unit transmits a signal for fault diagnosis in a specified cycle.

5. A monitoring terminal devices, comprising:
   a sensor unit;
   a wireless transmitting unit to transmit, by wireless, an output from said sensor unit; and
   a control unit to start operations of said sensor unit in a specified cycle and to have said sensor unit operate for a specified period of time and to start operations of said wireless transmitting unit in a cycle being longer than said specified cycle and to have said wireless transmitting unit to perform operations of communications for a specified period of time,
   wherein said control unit makes said starting cycles of said sensor unit variable depending on a type of said sensor unit.

6. The monitoring terminal device according to claim 5, further comprising a power source including at least one of a solar cell, a secondary cell, and a capacitor.

7. The monitoring terminal device according to claim 5, wherein said sensor unit comprises a proximity-perception-type lead switch.

8. The monitoring terminal device according to claim 5, wherein said wireless transmitting unit transmits a signal for fault diagnosis in a specified cycle.

* * * * *